(12) United States Patent
Yu et al.

(10) Patent No.: US 9,008,717 B2
(45) Date of Patent: Apr. 14, 2015

(54) METHOD FOR TRANSFERRING BASE STATION ENERGY-SAVING INFORMATION AND METHOD AND SYSTEM FOR IMPLEMENTING ENERGY-SAVING

(75) Inventors: Yuanfang Yu, Shenzhen (CN); Yonggang Fang, Shenzhen (CN); Ting Lu, Shenzhen (CN); Xiaowu Zhao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/007,199

(22) PCT Filed: Feb. 22, 2012

(86) PCT No.: PCT/CN2012/071425
§ 371 (c)(1),
(2), (4) Date: Sep. 24, 2013

(87) PCT Pub. No.: WO2012/130000
PCT Pub. Date: Oct. 4, 2012

(65) Prior Publication Data
US 2014/0018057 A1  Jan. 16, 2014

(30) Foreign Application Priority Data

Mar. 25, 2011 (CN) .......................... 2011 1 0074311

(51) Int. Cl.
*H04B 7/00* (2006.01)
*H04W 52/02* (2009.01)
(Continued)

(52) U.S. Cl.
CPC .......... *H04W 52/0206* (2013.01); *H04W 52/00* (2013.01); *H04W 52/04* (2013.01); *H04W 52/02* (2013.01); *Y02B 60/50* (2013.01)

(58) Field of Classification Search
CPC ................. H04W 52/0203; H04W 52/0206; H04W 52/04; H04W 52/18; H04W 76/00; H04W 52/0235; H04W 52/325; H04W 52/0245; H04W 52/02; H04W 52/00
USPC ........ 455/446, 449, 450, 452.1, 452.2, 432.3, 455/435.2, 436, 522, 524, 561, 574, 572, 455/573
See application file for complete search history.

(56) References Cited

U.S. PATENT DOCUMENTS 8,700,085 B2 * 4/2014 Johnsson et al. ............... 455/522
2010/0232327 A1 * 9/2010 Kim et al. ..................... 370/311
(Continued)

FOREIGN PATENT DOCUMENTS

| CN | 101873677 A | 10/2010 |
|---|---|---|
| CN | 101938820 A | 1/2011 |
| CN | 101965038 A | 2/2011 |

OTHER PUBLICATIONS

International Search Report for PCT/CN2012/071425 dated May 7, 2012.
(Continued)

*Primary Examiner* — Jean Gelin
(74) *Attorney, Agent, or Firm* — Ling Wu; Stephen Yang; Ling and Yang Intellectual Property

(57) ABSTRACT

The invention discloses a method for transmitting energy-saving management information. The method includes: a base station and its neighboring base station encapsulating and transmitting the energy-saving management information through an interface message. The invention further discloses a corresponding method for implementing base station energy saving, a system for transmitting the energy-saving management information, and a system for implementing base station energy saving. The invention can be used to solve transmission of the energy-saving information between base station devices of a network, and avoid the problems, for example, handoff and coverage loss caused by the base station being required to be shut off due to reasons such as energy saving, etc., thus guaranteeing network performance and user experience when the base station is performing the energy saving operation.

12 Claims, 7 Drawing Sheets

(51) Int. Cl.
 *H04W 52/00* (2009.01)
 *H04W 52/04* (2009.01)

(56) References Cited

U.S. PATENT DOCUMENTS

2013/0225228 A1* 8/2013 Park et al. .................. 455/522
2013/0310040 A1* 11/2013 Kwun ......................... 455/436

OTHER PUBLICATIONS

Technical Specification Group Radio Access Network: "3GPP TR 36.927 V1.1.1, Evolved Universal Terrestrial Radio Access (E-UTRA); Potential solutions for energy saving for E-UTRAN (Release 10)", 3rd Generation Partnership Project(3GPP); Technical Report(TR), Mar. 11, 2011, sections 5.1.2-6.2.3.

* cited by examiner

METHOD FOR TRANSFERRING BASE STATION ENERGY-SAVING INFORMATION AND METHOD AND SYSTEM FOR IMPLEMENTING ENERGY-SAVING

TECHNICAL FIELD

The invention relates to the field of mobile communication technology, and in particular, to a method for transmitting energy-saving management information and a method and system for implementing energy saving.

BACKGROUND OF THE RELATED ART

With the continuous improvement of the society and the continuous development of the science and technology, people now pay more and more concern to the earth that we depend on for survival, and most countries in the world have already fully realized the importance of the environment to our human development, and have made the promise on the emission reduction objective. Energy saving and emission reduction is also regarded as a long-term development strategy of the sustainable development of our country, and to realize the low carbon economy has already become responsibility that cannot be avoided in the economic and social development at present.

For the communication industry, its impact on the global climate cannot be ignored. In the current global carbon dioxide discharge amount, the communication industry nearly accounts for 2%, which is comparable to the air transport industry and is increasing progressively at the speed of about 4% per year, and it is estimated that the carbon dioxide discharge amount of the global communication industry will reach 1.43G ton in 2020. The main reason for the communication industry to discharge the carbon dioxide is the production and consumption of the electricity. In 2007, the electricity consumption of the communication industry accounts for 8% of the global total electricity quantity, and it is estimated that the communication industry will consume 14% of the global electricity energy in 2020 according to the current growth rate. The daily increased electric charge and cost have also brought bigger and bigger influence to the enterprise profits. The governments and enterprises of various countries have already realized the influence and significance of the communication industry on the energy saving and emission reduction, and the green communication has already become the hot topic. During the process of advocating the green communication, the operators of various countries have announced the energy saving and emission reduction promise to the society, and in order to realize these objectives of the energy saving and emission reduction, the valid power-saving technology needs to be introduced. According to the statistical data, the energy consumption of the base station accounts for about 70% of the total energy consumption of the communication devices, therefore, to reduce the power consumption of the base station and its corollary devices is effective means to reduce the power consumption of the communication industry.

The communication system is bearing the function of providing the communication service for the user, so it must be ensured as much as possible that the user service is not influenced while the energy saving is considered. But according to the current technology, no corresponding solution has been put forward yet for the problems, such as, how to avoid the handoff and coverage loss caused by the base station being shut off when the base station needs to be shut off due to the reasons such as the energy saving etc., and how to reduce the search to the shutoff base station by the terminal (if the pilot frequency information to which the shutoff base station belongs is still included in the neighbor list message of other base stations, then the terminal will still search for the pilot frequency after receiving the message, thus increasing the power consumption of the terminal), and other problems.

SUMMARY OF THE INVENTION

The technical problem required to be solved by the invention is to provide a method for transmitting energy-saving management information and a method and system for implementing energy saving, which can perform transmission of the energy-saving information between the base station devices, thereby avoiding the problems, such as handoff and coverage loss caused by the operation, such as, the energy saving of the base station, etc.

In order to solve the above-mentioned technical problem, the invention provides a method for transmitting energy-saving management information, comprising:

a base station and a neighboring base station encapsulating and transmitting the energy-saving management information through an interface message.

Preferably, the energy-saving management information comprises energy saving status information, wherein, the energy saving status information comprises one or more of the following information:

an energy-saving mode activation indication, an energy-saving mode deactivation indication, a compensation mode activation indication, a compensation mode deactivation indication, a non-service status indication, an non-service status exiting indication, an energy saving request acceptance indication, an energy saving request failure indication, and failure reason information.

Preferably, the energy-saving management information comprises the energy-saving management information of the following base stations:

a base station detected in a non-service status, a base station entering an energy-saving mode, a base station exiting the energy-saving mode, a base station entering a compensation mode, a base station exiting the compensation mode, and a base station exiting the non-service status.

Preferably, the energy-saving management information comprises base station information, wherein, the base station information comprises one of the following information or any combination thereof:

cell information, sector information, and/or carrier information.

Preferably, the interface message comprises an energy saving notification message, an energy saving request message or an energy saving response message.

Preferably, the interface comprises: an interface between base stations, and an interface between a base station and a mobile switching center; and the interface is a newly defined interface or an existing interface.

Preferably, the energy-saving management information further comprises energy saving configuration information, wherein, the energy saving configuration information comprises one of the following or a combination thereof: an energy saving related parameter identifier, an energy saving operation timer and an energy saving operation threshold which are pre-configured between the base stations.

The invention further provides a method for implementing base station energy saving, comprising:

when a base station is detected to be unable to provide a service or determines to enter an energy-saving mode, transmitting energy-saving management information to a neighboring base station; and after the neighboring base station receives the energy-saving management information, determining whether to enter a compensation mode or not; wherein, the compensation mode comprises one of the following or a combination thereof: performing a coverage compensation to the base station, and updating a parameter of a neighboring cell.

Preferably, the base station transmits the energy-saving management information to the neighboring base station through an energy saving request message, wherein, the energy-saving management information comprises base station information and/or energy saving status information, wherein, the base station information comprises: cell information, sector information, and/or carrier information; the energy saving status information comprises one or more of the following information: an energy-saving mode activation indication, a non-service status indication or a compensation mode activation indication;

if the neighboring base station accepts the energy-saving mode activation indication, the non-service status indication or the compensation mode activation indication, then the neighboring base station returns an energy saving response message carrying an energy-saving mode activation acceptance indication, a non-service status confirmation indication or a compensation mode activation acceptance indication, and enters a compensation mode at the same time; if not, then the neighboring base station returns an energy saving response message carrying an energy-saving mode activation failure or a compensation mode activation failure indication; and the base station enters a non-service status or an energy-saving mode when receiving the energy saving response message returned by the neighboring base station and when the energy saving response message carries the energy-saving mode activation acceptance indication, the non-service status confirmation indication or the compensation mode activation acceptance indication.

Preferably, the base station transmits the energy-saving management information to the neighboring base station through the energy saving notification message, and the energy-saving management information comprises the base station information and/or the energy saving status information, wherein, the base station information comprises: cell information, sector information, and/or carrier information; and the energy saving status information comprises one or more of the following information: an energy-saving mode activation indication, a non-service status indication or a compensation mode activation indication; and the base station enters a non-service status or an energy-saving mode after transmitting the energy saving notification message.

Preferably, the method further comprises:
when the base station determines to exit the non-service status or exit the energy-saving mode, transmitting an energy saving notification message carrying an non-service status exiting indication or an energy-saving mode deactivation indication to the neighboring base station;

if the neighboring base station accepts the non-service status exiting indication or the energy-saving mode deactivation indication, then exiting the compensation mode; and the base station exiting the non-service status or exiting the energy-saving mode after transmitting the energy saving notification message.

Preferably, the method further comprises:
when the base station determines to exit the non-service status or exit the energy-saving mode, transmitting an energy saving request message carrying an non-service status exiting indication or an energy-saving mode deactivation indication to the neighboring base station;

if the neighboring base station accepts the non-service status exiting indication or the energy-saving mode deactivation indication, then exiting the compensation mode, and at the same time returning an energy saving response message carrying a non-service status exiting acceptance indication or an energy-saving mode deactivation acceptance indication; if the non-service status exiting indication or the energy-saving mode deactivation indication is not accepted, then returning an energy saving response message carrying a non-service status exiting failure indication or an energy-saving mode deactivation failure indication and/or a failure reason value; and the base station exiting the non-service status or exiting the energy-saving mode when receiving the energy saving response message returned by the neighboring base station and when the energy saving response message carries the non-service status acceptance indication or the energy-saving mode deactivation acceptance indication; otherwise, continuing to maintain the non-service status or the energy-saving mode.

Preferably, the method further comprises:
when the neighboring base station determines to exit the compensation mode, transmitting an energy saving notification message carrying the compensation mode deactivation indication to the base station, and exiting the compensation mode after transmitting the energy saving notification message; and if the base station accepts the compensation mode deactivation indication, then exiting the non-service status or exiting the energy-saving mode.

Preferably, the method further comprises:
when the neighboring base station determines to exit the compensation mode, transmitting an energy saving request message carrying the compensation mode deactivation indication to the base station;

if the base station accepts the compensation mode deactivation indication, then exiting the non-service status or exiting the energy-saving mode, and returning an energy saving response message carrying the compensation mode deactivation acceptance indication at the same time; if the compensation mode deactivation indication is not accepted, then returning an energy saving response message carrying a compensation mode deactivation failure indication and/or a failure reason value; and the neighboring base station exiting the compensation mode when receiving the energy saving response message returned by the base station and when the energy saving response message carries a compensation mode deactivation acceptance indication.

Preferably, the method further comprises:
the energy saving notification message, the energy saving request message or the energy saving response message is transmitted through an interface between the base stations or an interface between the base station and a mobile switching center; and the energy-saving management information further comprises energy saving configuration information, wherein, the energy saving configuration information comprises one of the following or a combination thereof: an energy saving related parameter identifier, an energy saving operation timer and an energy saving operation threshold which are pre-configured between the base stations.

The invention further provides a system for transmitting energy-saving management information, comprising a message capsulation module and a message transmission module in a base station, wherein, the message capsulation module is configured to capsulate the energy-saving management information through an interface message; and the message transmission module is configured to transmit the energy-saving management information through transmitting the interface message.

Preferably, the energy-saving management information encapsulated by the message capsulation module comprises energy saving status information, wherein, the energy saving status information comprises one or more of the following information:

an energy-saving mode activation indication, an energy-saving mode deactivation indication, a compensation mode activation indication, a compensation mode deactivation indication, a non-service status indication, an non-service status exiting indication, an energy saving request acceptance indication, an energy saving request failure indication, and failure reason information.

Preferably, the energy-saving management information encapsulated by the message capsulation module comprises the energy-saving management information of the following base stations:

a base station detected in a non-service status, a base station entering an energy-saving mode, a base station exiting the energy-saving mode, a base station entering a compensation mode, a base station exiting the compensation mode, and a base station exiting the non-service status.

Preferably, the energy-saving management information encapsulated by the message capsulation module comprises base station information, wherein, the base station information comprises one of the following information or any combination thereof:

cell information, sector information, and/or carrier information.

Preferably, the energy-saving management information encapsulated by the message capsulation module further comprises energy saving configuration information, wherein, the energy saving configuration information comprises one of the following or a combination thereof: an energy saving related parameter identifier, an energy saving operation timer and an energy saving operation threshold which are pre-configured between the base stations.

In addition, the invention further provides a system for implementing base station energy saving, comprising an energy-saving information transmission module and an energy-saving information receiving module in a base station, wherein, the energy-saving information transmission module is configured to: when a local base station is detected to be unable to provide a service or determines to enter an energy-saving mode, transmit energy-saving management information to a neighboring base station; and the energy-saving information receiving module is configured to: determine whether to enter a compensation mode or not after receiving the energy-saving management information transmitted by the neighboring base station; wherein, the compensation mode comprises one of the following or a combination thereof: performing a coverage compensation to the base station, and updating a parameter of a neighboring cell.

Preferably, the energy-saving information transmission module is further configured to: transmit the energy-saving management information to the neighboring base station through an energy saving request message, wherein, the energy-saving management information comprises base station information and/or energy saving status information; and enter a non-service status or an energy-saving mode when receiving an energy saving response message returned by the neighboring base station and when the energy saving response message carries an energy-saving mode activation acceptance indication, a non-service status confirmation indication or a compensation mode activation acceptance indication; wherein, the base station information comprises: cell information, sector information, and/or carrier information; and the energy saving status information comprises one or more of the following information: an energy-saving mode activation indication, a non-service status indication or a compensation mode activation indication;

the energy-saving information receiving module is further configured to: if the energy-saving mode activation indication, the non-service status indication or the compensation mode activation indication is accepted, then return an energy saving response message carrying an energy-saving mode activation acceptance indication, a non-service status confirmation indication or a compensation mode activation acceptance indication, and enter a compensation mode at the same time; if not, then return an energy saving response message carrying an energy-saving mode activation failure or a compensation mode activation failure indication.

Preferably, the energy-saving information transmission module is configured to: transmit the energy-saving management information to the neighboring base station through an energy saving notification message, wherein the energy-saving management information comprises the base station information and/or the energy saving status information; and enter a non-service status or an energy-saving mode after transmitting the energy saving notification message; and wherein, the base station information comprises: cell information, sector information, and/or carrier information; and the energy saving status information comprises one or more of the following information: an energy-saving mode activation indication, a non-service status indication or a compensation mode activation indication.

Preferably, the energy-saving information transmission module is further configured to: when determining to exit the non-service status or exit the energy-saving mode, transmit to the neighboring base station an energy saving notification message carrying an non-service status exiting indication or an energy-saving mode deactivation indication; and exit the non-service status or exit the energy-saving mode after transmitting the energy saving notification message; and the energy-saving information receiving module is further configured to: if the non-service status exiting indication or the energy-saving mode deactivation indication is accepted, then exit the compensation mode.

Preferably, the energy-saving information transmission module is further configured to: when determining to exit the non-service status or exit the energy-saving mode, transmit an energy saving request message carrying an non-service status exiting indication or an energy-saving mode deactivation indication to the neighboring base station; and exit the non-service or exit the energy-saving mode when receiving the energy saving response message returned by the neighboring base station and the energy saving response message carries the non-service status acceptance indication or the energy-saving mode deactivation acceptance indication; otherwise, continue to maintain the non-service status or the energy-saving mode; and the energy-saving information receiving module is further configured to: if the non-service status exiting indication or the energy-saving mode deactivation indication is accepted, then exit the compensation mode, and at the same time return an energy saving response message carrying a non-service status exiting acceptance indication or an energy-saving mode deactivation acceptance indication; if the non-service status exiting indication or the energy-saving mode deactivation indication is not accepted, then return an energy saving response message carrying a non-service status exiting failure indication or an energy-saving mode deactivation failure indication and/or a failure reason value.

Preferably, the energy-saving information transmission module is further configured to: when determining to exit the compensation mode, transmit an energy saving notification message carrying the compensation mode deactivation indication to the base station, and exit the compensation mode after transmitting the energy saving notification message; and the energy-saving information receiving module is further configured to: if the compensation mode deactivation indication is accepted, then exit the non-service status or exit the energy-saving mode.

Preferably, the energy-saving information transmission module is further configured to: when determining to exit the compensation mode, transmit an energy saving request message carrying the compensation mode deactivation indication to the base station; and exit the compensation mode when receiving the energy saving response message returned by the base station and when the energy saving response message carries a compensation mode deactivation acceptance indication; and the energy-saving information receiving module is further configured to: if the compensation mode deactivation indication is accepted, then exit the non-service status or exit the energy-saving mode, and return an energy saving response message carrying the compensation mode deactivation acceptance indication at the same time; if the compensation mode deactivation indication is not accepted, then return an energy saving response message carrying a compensation mode deactivation failure indication.

Preferably, the energy-saving information transmission module is further configured to: transmit the energy saving notification message, the energy saving request message or the energy saving response message through an interface between the base stations or an interface between the base station and a mobile switching center; and the energy-saving management information in the transmitted energy saving notification message, energy saving request message or energy saving response message further comprises an energy saving configuration information, wherein, the energy saving configuration information comprises one of the following or a combination thereof: an energy saving related parameter identifier, an energy saving operation timer and an energy saving operation threshold which are pre-configured between the base stations.

The embodiments of the invention provide a method for transmitting the energy saving related information between the base stations and implementing the energy saving based on the energy saving related information, which can be used to solve transmission of the energy-saving information between base station devices of a network, and avoid the problems such as handoff and coverage loss caused by the base station being required to be shut off due to reasons such as energy saving, etc., thus guaranteeing network performance and user experience when the base station is performing the energy saving operation; in addition, when the base station is in the non-service status, it can notify its neighboring base stations to allow these neighboring base stations to adjust the corresponding parameters, thus avoiding the problems such as handoff, coverage loss, and increase of power consumption at the terminal caused by abnormality of the base station.

BRIEF DESCRIPTION OF DRAWINGS

The drawings to be described here are used to provide further understanding of the invention, and constitute part of the present application. The illustrative examples of the invention and description thereof are used to explain the invention, rather than to limit the invention. In the drawings.

PREFERRED EMBODIMENTS OF THE INVENTION

Figure 1:
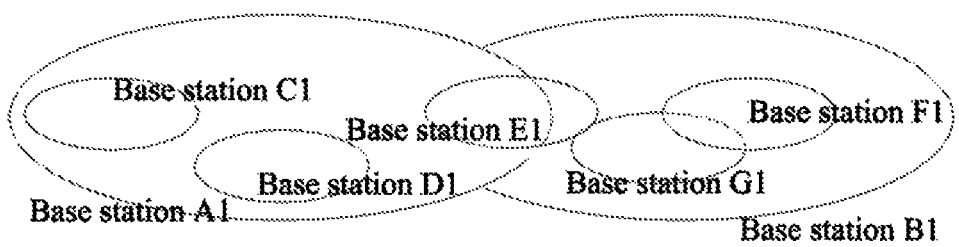
FIG. 1 shows a topology diagram of base station coverage in a communication network.
Figure 2:
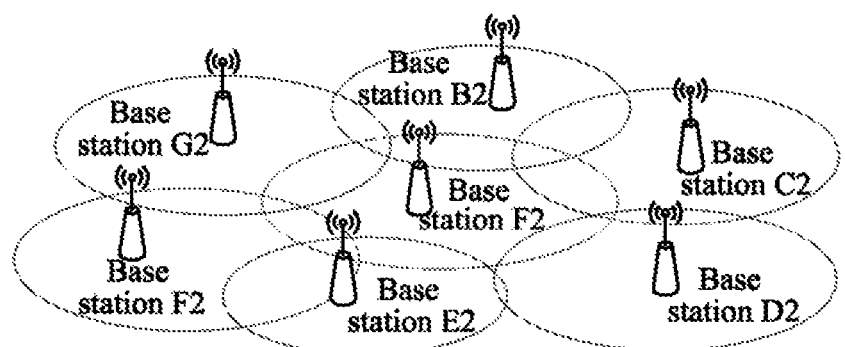
FIG. 2 shows another topology diagram of base station coverage in a communication network.

In the communication system, usually the network coverage is provided by the base station and its neighboring base station together. FIG. 1 and FIG. 2 show two kinds of base station topology structures respectively, that is, overlapping coverage and non-overlapping coverage. Wherein, in the scene of overlapping coverage as shown in FIG. 1, the shutoff of the base station C1, D1, E1, F1 and G1 does not need to perform the coverage compensation; while for the scene of non-overlapping coverage as shown in FIG. 2, it needs to perform the coverage compensation when shutting off any base station. So, when a certain base station needs to be shut off because of a factor such as, energy saving, etc., and the base station is in a non-service status, its neighboring base stations need to be notified, so that these neighboring base stations adjust the corresponding parameters, thus avoiding the problems, such as, handoff, coverage loss and increase of the power consumption of the terminal caused by the energy saving operation of the base station or abnormality of the base station.

However, since the current network framework does not support transmission of this energy-saving information between the base station devices, in order to realize the energy saving of the base station device effectively, the method that enables the energy-saving information to be transmitted between the base stations needs to be provided.

In consideration of the problem that the related art does not support transmitting the energy saving related information between the base station devices, the invention provides a method of interacting energy-saving management information, which uses the following technical scheme specifically:

a base station and its neighboring base station encapsulating and transmitting the energy-saving management information through an interface message.

Wherein, the energy-saving management information can include energy saving status information, wherein, the energy saving status information includes one or more of the following information:

an energy-saving mode activation indication, an energy-saving mode deactivation indication, a compensation mode activation indication, a compensation mode deactivation indication, a non-service status indication, an non-service status exiting indication, an energy saving request acceptance indication, an energy saving request failure indication, and failure reason information.

Wherein, the energy-saving mode activation indicates requesting to enter an energy-saving mode; the energy-saving mode deactivation indicates requesting to exit the energy-saving mode; the compensation mode activation indicates requesting to enter a compensation mode; and the compensation mode deactivation indicates requesting to exit the compensation mode.

Wherein, the energy saving request acceptance indication further includes the following indication information:

energy-saving mode activation acceptance, an energy-saving mode deactivation, compensation mode activation, compensation mode deactivation, non-service status confirmation, etc.

In addition, the transmitted energy-saving management information can further include the energy-saving management information of the following base stations:

a base station detected in a non-service status, a base station entering an energy-saving mode, a base station exiting the energy-saving mode, a base station entering a compensation mode, a base station exiting the compensation mode, and a base station exiting the non-service status.

Further, the energy-saving management information further includes base station information, wherein, the base station information includes cell information, sector information, and/or carrier information.

Wherein, the interface includes: an interface between base stations, and an interface between a base station and a mobile switching center.

The interface message specifically includes:
an energy saving notification message;
an energy saving request message; and
an energy saving response message.

The transmission of the interface message can be as below:
the base station transmits an energy saving notification message to the neighboring base station, and the energy saving notification message is encapsulated with the energy-saving management information, including the base station information and the energy saving status information, etc.;

or, the base station transmits the energy saving notification message to the mobile switching center, the energy saving notification message is encapsulated with the energy-saving management information, including the base station information and the energy saving status information, etc.; and the mobile switching center transmits the energy saving notification message to the neighboring base station of the base station after receiving the energy saving notification message.

The transmission of the interface message specifically can be as below:
the base station transmits an energy saving request message to the neighboring base station; the neighboring base station returns an energy saving response message to the base station after receiving the energy saving request message, the energy saving response message is encapsulated with the energy-saving management information;

or, the base station transmits an energy saving request message to the mobile switching center, and the mobile switching center transmits the received energy saving request message to the neighboring base station of the base station; the neighboring base station returns an energy saving response message back after receiving the energy saving request message, and the energy saving response message is encapsulated with the energy-saving management information; and the mobile switching center transmits the received energy saving response message to the base station.

The energy-saving management information further includes the energy saving configuration information, wherein, the energy saving configuration information includes one of the following or a combination thereof: an energy saving related parameter identifier (the identifier is corresponding to multiple sets of preset parameters respectively), an energy saving operation timer and an energy saving operation threshold which are pre-configured between the base stations, wherein, the energy saving operation timer can be used for explaining the maintaining time of the energy saving status; and the energy saving operation threshold can be used for explaining that the energy saving request can be accepted when the service volume of the destination base station is less than the threshold.

In addition, a method for implementing energy saving is further provided by the invention, including:
when a base station is detected to be unable to provide a service or determines to enter an energy-saving mode, transmitting energy-saving management information to a neighboring base station; and after receiving the energy-saving management information, the neighboring base station determining whether to enter a compensation mode or not; wherein, the compensation mode includes one of the following or a combination thereof: performing a coverage compensation to the base station, and updating a parameter of a neighboring cell.

Wherein, the energy-saving management information includes base station information and/or energy saving status information, wherein, the base station information includes: cell information, sector information, and/or carrier information; and the energy saving status information includes one or more of the following information: an energy-saving mode activation indication, a non-service status indication or a compensation mode activation indication.

Preferably, when determining to exit the non-service status or exit the energy-saving mode, the base station sends the energy saving notification message carrying the non-service status exiting indication or the energy-saving mode deactivation indication to the neighboring base station.

When determining to exit the non-service status or exit the energy-saving mode, the base station sends the energy saving notification message carrying the non-service status exiting indication or the energy-saving mode deactivation indication to the neighboring base station;

if the neighboring base station accepts the non-service status exiting indication or the energy-saving mode deactivation indication, then the neighboring base station exits the compensation mode.

Or, when determining to exit the non-service status or exit the energy-saving mode, the base station transmits an energy saving request message carrying an non-service status exiting indication or an energy-saving mode deactivation indication to the neighboring base station;

if the neighboring base station accepts the non-service status exiting indication or the energy-saving mode deactivation indication, then the neighboring base station exits the compensation mode, and at the same time returns an energy saving response message carrying a non-service status exiting acceptance indication or an energy-saving mode deactivation acceptance indication; if the non-service status exiting indication or the energy-saving mode deactivation indication is not accepted, then the neighboring base station returns an energy saving response message carrying a non-service status exiting failure indication or an energy-saving mode deactivation failure indication and/or a failure reason value;

the base station exits the non-service or exits the energy-saving mode upon receiving the energy saving response message returned by the neighboring base station and when the energy saving response message carries the non-service status acceptance indication or the energy-saving mode deactivation acceptance indication; otherwise, it continues to maintain the non-service status or the energy-saving mode.

Further, when determining to exit the compensation mode, the neighboring base station transmits an energy saving notification message carrying the compensation mode deactivation indication to the base station, and exits the compensation mode after transmitting the energy saving notification message; and if the base station accepts the compensation mode deactivation indication, then base station exits the non-service status or exits the energy-saving mode.

Or, when determining to exit the compensation mode, the neighboring base station transmits an energy saving request message carrying the compensation mode deactivation indication to the base station;

if the base station accepts the compensation mode deactivation indication, then the base station exits the non-service status or exits the energy-saving mode, and returns the energy saving response message carrying the compensation mode deactivation acceptance indication at the same time; if the compensation mode deactivation indication is not accepted, then the base station returns an energy saving response message carrying a compensation mode deactivation failure indication and/or a failure reason value; and the neighboring base station exits the compensation mode when receiving the energy saving response message returned by the base station and when the energy saving response message carries a compensation mode deactivation acceptance indication.

Further, the energy saving notification message, the energy saving request message or the energy saving response message is transmitted through an interface between the base stations or an interface between the base station and a mobile switching center; and in addition, the energy-saving management information further includes an energy saving configuration information, wherein, the energy saving configuration information comprises one of the following or a combination thereof: an energy saving related parameter identifier, an energy saving operation timer and an energy saving operation threshold which are pre-configured between the base stations.

In order to facilitate description of the invention, the implementation of the technical scheme of the invention will be described in detail with reference to the accompanying drawings and in combination with embodiments hereinafter. It should be illustrated that, in the case of not conflicting, the examples in the present application and features in these examples can be combined with each other.

In the following embodiments, depiction will be made by taking a code division multiple access (CDMA) 2000 1x base station or CDMA2000 a CDMA 2000 EVDO base station (BS) for an example, but the method of the invention is not limited to these two kinds of base stations. In addition, the triggering condition of entering/exiting the energy-saving mode, entering/exiting the compensation mode in the invention can be determined according to the actual conditions, for example, the service volume of the base station is reduced/increased to a certain range, or a timer of entering/exiting the energy saving/compensation mode regularly is triggered etc.

Example One

Figure 3:
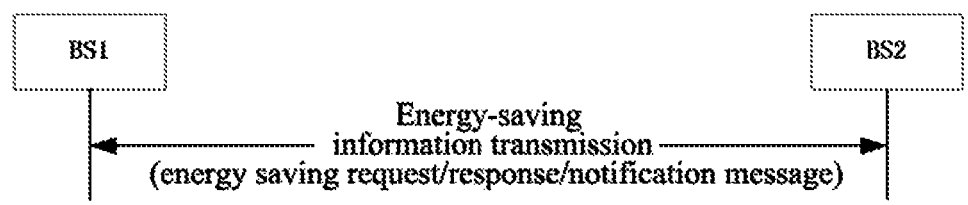
FIG. 3 shows a diagram of transmitting energy-saving information through an interface between base stations according to an embodiment of the invention.

FIG. 3 shows a diagram of transmitting energy-saving information through an interface between base stations according to the invention. As shown in FIG. 3, the base station (BS1) can transmit the energy-saving information to its neighboring base station (BS2) through a message, such as, energy saving notice/request/response, etc.

Example Two

Figure 4:
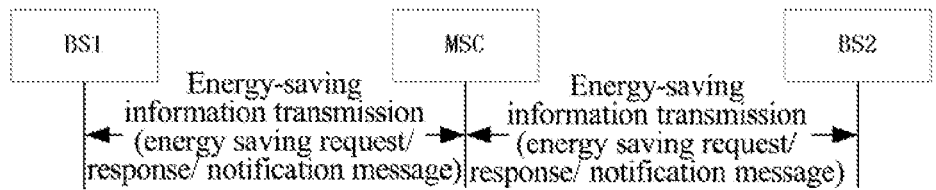
FIG. 4 shows a diagram of transmitting energy-saving information through an interface between a base station and a mobile switching center according to an embodiment of the invention.

FIG. 4 shows a diagram of transmitting energy-saving information through an interface between a base station and a mobile switching center according to the invention. As shown in FIG. 4, the base station transmits the energy-saving information to the mobile switching center through a message, such as, energy saving notice/request/response, etc., and the mobile switching center transmits it to its neighboring base station, thus implementing transmission of the energy-saving information between the base station and its neighboring base station.

Example Three

Figure 5:
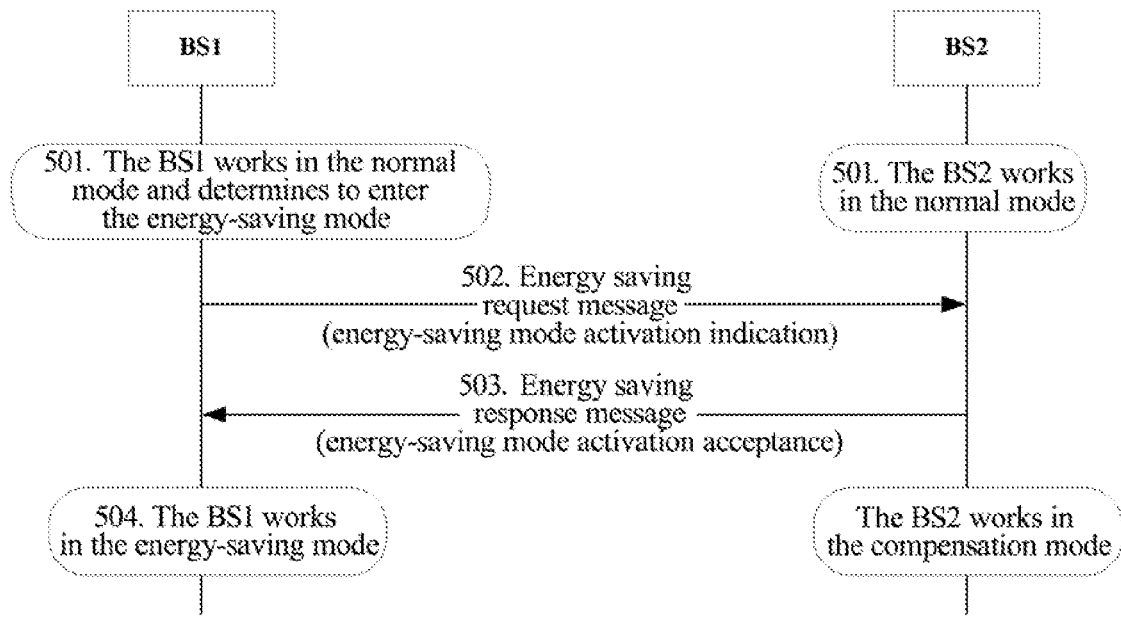
FIG. 5 shows a flow chart of successfully activating an energy-saving mode through an interface between base stations according to an embodiment of the invention.

FIG. 5 shows a flow chart of successfully activating an energy-saving mode through an interface between base stations. As shown in FIG. 5, the procedure mainly includes the following steps:

in step 501: the BS1 and the BS2 are in the normal mode, the BS1 determines to enter the energy-saving mode; here the BS1 and the BS2 can be cdma2000 1x base stations or cdma2000 EVDO base stations;

in step 502: the BS1 transmits the energy saving request message to the BS2, wherein, the message can optionally include an energy-saving mode activation request indication, BS1 information, BS2 information, an energy saving configuration information, etc.; after this step, if the BS1 determines that there is no need to wait for the response message of the BS2, then the BS1 can enter the energy-saving mode, and the procedure is over; or proceeds to step 503 and step 504;

in step 503: the BS2 transmits the energy saving response message to the BS1, wherein, the message can optionally include the energy-saving mode activation acceptance indication, the BS1 information, the BS2 information, accepted energy saving configuration information, etc.; and the BS2 enters the compensation mode;

in step 504: the BS1 receives the energy saving response message, and the BS1 enters the energy-saving mode.

Example Four

Figure 6:
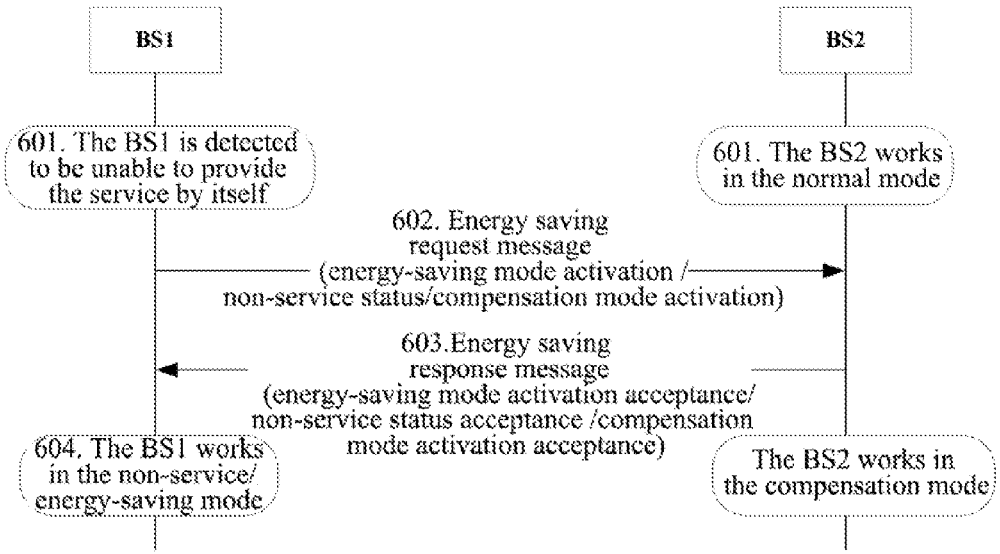
FIG. 6 shows a flow chart of requesting a neighboring base station to perform coverage compensation when a base station is unable to provide a service according to an embodiment of the invention.

The present embodiment is also applicable to the scenario that the neighboring base station is requested to perform the coverage compensation when the base station cannot provide the service. As shown in FIG. 6, when the BS1 is detected to be unable to provide the service by itself and the BS2 is in the normal mode, the procedure mainly includes the following steps:

in step 601: the BS1 is detected to be unable to provide the service by itself, the coverage compensation of the BS2 is requested; here, the BS1 and the BS2 can be the cdma2000 1x base stations or the cdma2000 EVDO base stations;

in step 602: the BS1 transmits the energy saving request message to the BS2, wherein, the message can optionally include the energy-saving mode activation request indication or the non-service status indication or the compensation mode activation indication, the BS1 information, the BS2 information, or the energy saving configuration information, etc.;

in step 603: the BS2 transmits the energy saving response message to the BS1, wherein, the message can optionally include the energy-saving mode activation acceptance indication or the non-service status confirmation indication or the compensation mode activation acceptance indication, the BS1 information, the BS2 information, the accepted energy saving configuration information, etc.; and the BS2 enters the compensation mode;

in step 604: the BS1 receives the energy saving response message, and the BS1 enters the energy-saving mode or is maintained in the non-service mode.

Example Five

Figure 7:
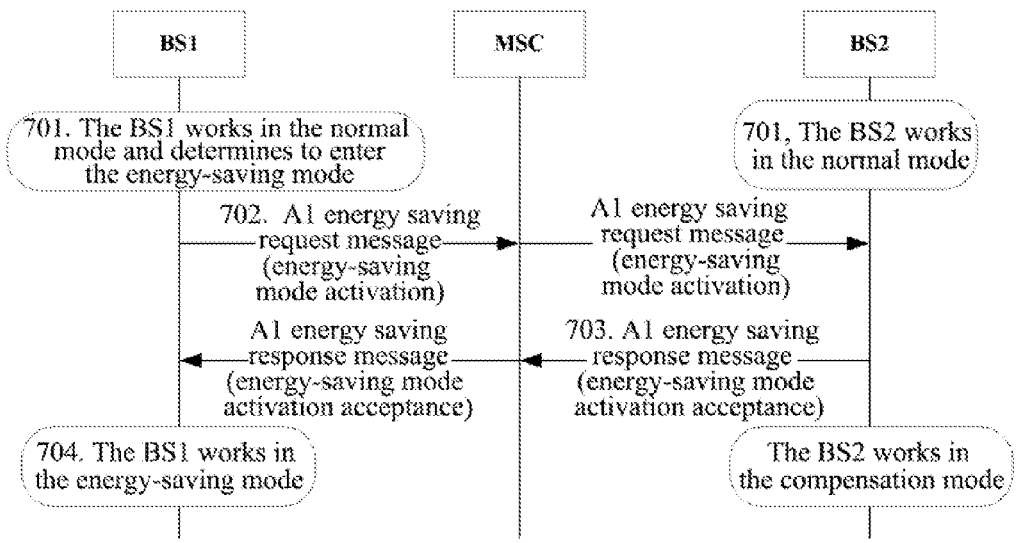
FIG. 7 shows a flow chart of successfully activating an energy-saving mode through an interface A1 according to an embodiment of the invention.

FIG. 7 shows a flow chart of a base station successfully activating an energy-saving mode through an interface A1. As shown in FIG. 7, the procedure mainly includes the following steps:

in step 701: the BS1 and the BS2 are in the normal mode, the BS1 determines to enter the energy-saving mode; and the BS 1 and the BS2 here are the cdma2000 1x base stations;

in step 702: the BS1 transmits the energy saving request message to the BS2 through the MSC, specifically including that: the BS1 transmits the energy saving request message to the MSC, the MSC transmits the energy saving request message to the BS2; the energy saving request message can optionally include the energy-saving mode activation request indication, the BS1 information, the BS2 information, the energy saving configuration identification information, the energy saving configuration information, etc.; after this step, if the BS1 determines that there is no need to wait for the response message of the BS2, then the BS1 can enter the energy-saving mode, and the procedure is over; or proceeds to step 703 and step 704;

in step 703: the BS2 transmits the energy saving response message to the BS1 through the MSC, specifically including that: the BS2 transmits the energy saving response message to the MSC, the MSC transmits the energy saving response message to the BS1; the message can optionally include the energy-saving mode activation acceptance indication, the BS1 information, the BS2 information, the accepted energy saving configuration identification information, the energy saving configuration information, etc.; and the BS2 enters the compensation mode;

in step 704: the BS1 receives the energy saving response message, and the BS1 enters the energy-saving mode.

Example Six

Figure 8:
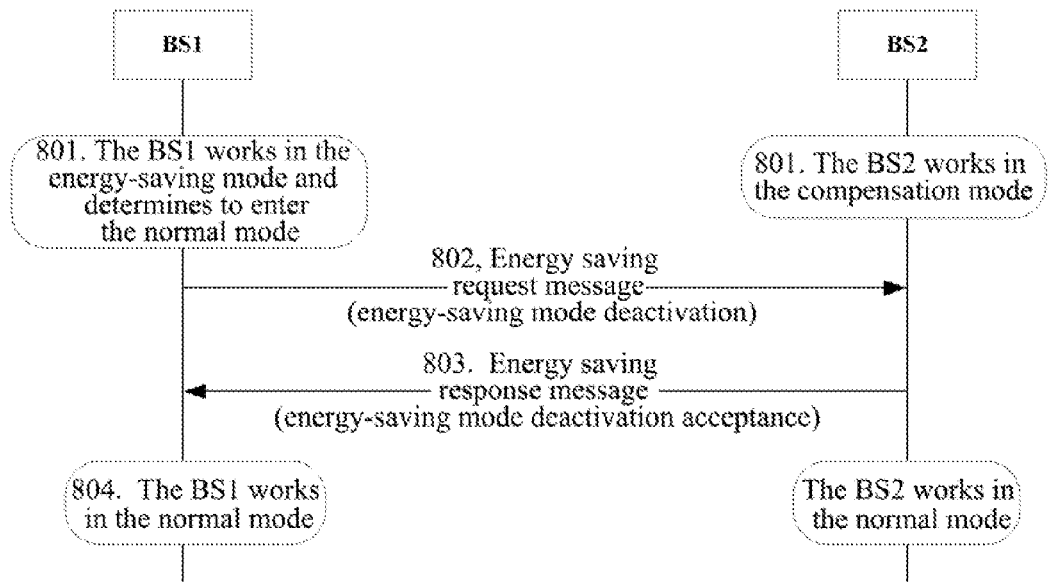
FIG. 8 shows a flow chart of a base station in an energy-saving mode deactivating an energy-saving mode through an interface between base stations according to an embodiment of the invention.

FIG. 8 shows a flow chart of a base station in an energy-saving mode deactivating an energy-saving mode through an interface between base stations. As shown in FIG. 8, the procedure mainly includes the following steps:

in step 801: the BS1 is in the energy-saving mode, the BS2 is in the compensation mode, and the BS1 determines to enter the normal mode; here the BS1 and the BS2 can be the cdma2000 1x base stations or the cdma2000 EVDO base stations;

in step 802: the BS1 transmits the energy saving request message to the BS2, wherein, the message can optionally include the energy-saving mode deactivation request indication, the BS1 information, the BS2 information, the energy saving configuration identification information, the energy saving configuration information, etc.; after this step, if the BS1 determines that there is no need to wait for the response message of the BS2, then the BS1 can enter the normal mode, and the procedure is over; or proceeds to step 803 and step 804;

in step 803: the BS2 transmits the energy saving response message to the BS1, wherein, the message can optionally include the energy-saving mode deactivation acceptance indication, the BS1 information, the BS2 information, the accepted energy saving configuration identification information and the energy saving configuration information, etc.; and the BS2 enters the normal mode;

in step 804: the BS1 receives the energy saving response message, and the BS1 enters the normal mode.

Example Seven

Figure 9:
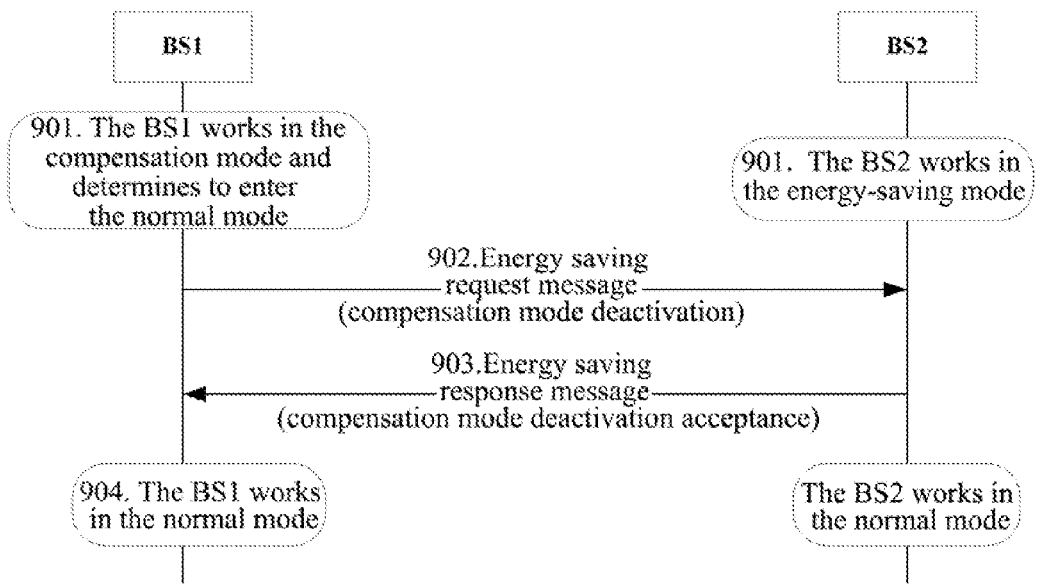
FIG. 9 shows a flow chart of a base station in a compensation mode deactivating a compensation mode through an interface between base stations according to an embodiment of the invention.

FIG. 9 shows a flow chart of a base station in a compensation mode deactivating a compensation mode through an interface between base stations. As shown in FIG. 9, the procedure mainly includes the following steps:

in step 901: the BS1 is in the compensation mode, the BS2 is in the energy-saving mode, and the BS1 determines to enter the normal mode; here the BS1 and the BS2 can be the cdma2000 1x base stations or the cdma2000 EVDO base stations;

in step 902: the BS1 transmits the energy saving request message to the BS2, wherein, the message can optionally include the compensation mode deactivation request indication, the BS1 information, the BS2 information, the energy saving configuration identification information, the energy saving configuration information, etc.; after this step, if the BS1 determines that there is no need to wait for the response message of the BS2, then the BS1 can enter the normal mode, and the procedure is over; or proceeds to step 903 and step 904;

in step 903: the BS2 transmits the energy saving response message to the BS1, wherein, the message can optionally include the compensation mode deactivation acceptance indication, the BS1 information, the BS2 information, the accepted energy saving configuration identification information, the energy saving configuration information, etc.; and the BS2 enters the normal mode;

in step 904: the BS1 receives the energy saving response message, and the BS1 enters the normal mode.

Example Eight

Figure 10:
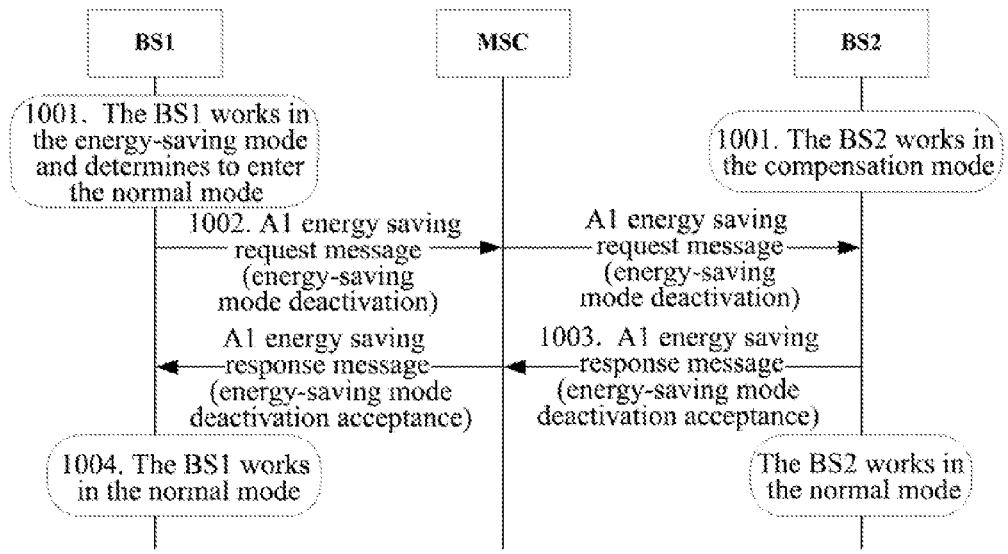
FIG. 10 shows a flow chart of a base station in an energy-saving mode deactivating an energy-saving mode through an interface A1 according to an embodiment of the invention.

FIG. 10 shows a flow chart of a base station in an energy-saving mode deactivating an energy-saving mode through an interface A1. As shown in FIG. 10, the procedure mainly includes the following steps:

in step 1001: the BS1 is in the energy-saving mode, the BS2 is in the compensation mode, and the BS1 determines to enter the normal mode; here the BS1 and the BS2 are the cdma2000 1x base stations;

in step 1002: the BS1 transmits the energy saving request message to the BS2 through the MSC, specifically including that: the BS1 transmits the energy saving request message to the MSC, the MSC transmits the energy saving request message to the BS2, wherein, the message can optionally include the energy-saving mode deactivation request indication, the BS1 information, the BS2 information, the energy saving configuration identification information, the energy saving configuration information, etc.; after this step, if the BS1 determines that there is no need to wait for the response message of the BS2, then the BS1 can enter the normal mode, and the procedure is over; or proceeds to step 1003 and step 1004;

in step 1003: the BS2 transmits the energy saving response message to the BS1 through the MSC, specifically including that: the BS2 transmits the energy saving response message to the MSC, and the MSC transmits the energy saving response message to the BS1; wherein, the message can optionally include the energy-saving mode deactivation acceptance indication, the BS1 information, the BS2 information, the accepted energy saving configuration identification information, the energy saving configuration information, etc.; and the BS2 enters the normal mode;

in step 1004: the BS1 receives the energy saving response message, and the BS1 enters the normal mode.

Example Nine

Figure 11:
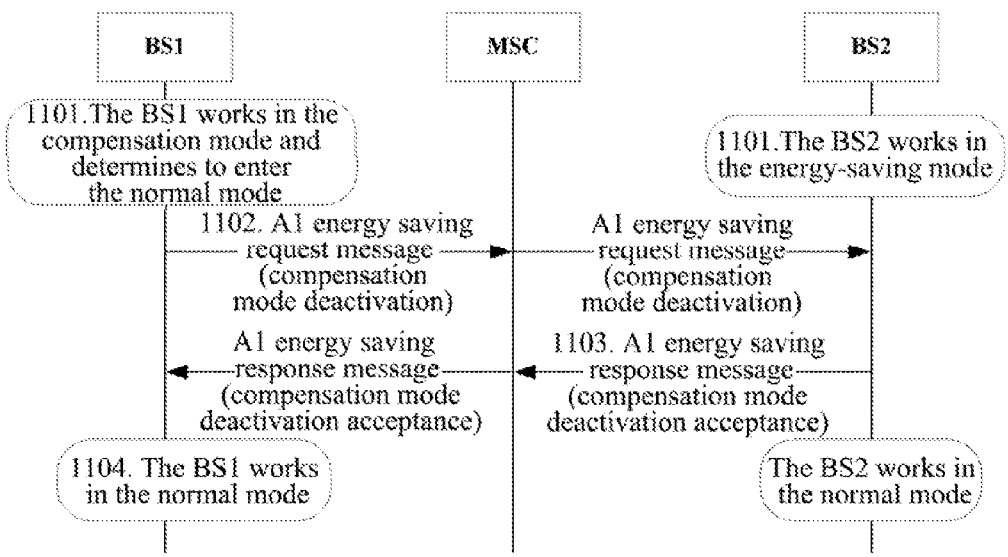
FIG. 11 shows a flow chart of a base station in a compensation mode deactivating a compensation mode through an interface A1 according to an embodiment of the invention.

FIG. 11 shows a flow chart of a base station in a compensation mode deactivating a compensation mode through an interface A1. As shown in FIG. 11, the procedure mainly includes the following steps:

in step 1101: the BS1 is in the compensation mode, the BS2 is in the energy-saving mode, and the BS1 determines to enter the normal mode; here the BS1 and the BS2 are the cdma2000 1x base stations;

in step 1102: the BS1 transmits the energy saving request message to the BS2 through the MSC, specifically including that: the BS1 transmits the energy saving request message to the MSC, the MSC transmits the energy saving request message to the BS2, wherein, the message can optionally include the compensation mode deactivation request indication, the BS1 information, the BS2 information, the energy saving configuration identification information, the energy saving configuration information, etc.; after this step, if the BS1 determines that there is no need to wait for the response message of the BS2, then the BS1 can enter the normal mode, and the procedure is over; or proceeds to step 1103 and step 1104;

in step 1103: the BS2 transmits the energy saving response message to the BS1 through the MSC, specifically including that: the BS2 transmits the energy saving response message to the MSC, and the MSC transmits the energy saving response message to the BS1; wherein, the message can optionally include the compensation mode deactivation acceptance indication, the BS1 information, the BS2 information, the accepted energy saving configuration identification information, the energy saving configuration information, etc.; and the BS2 enters the normal mode;

in step 1104: the BS1 receives the energy saving response message, and the BS1 enters the normal mode.

Example Ten

Figure 12:
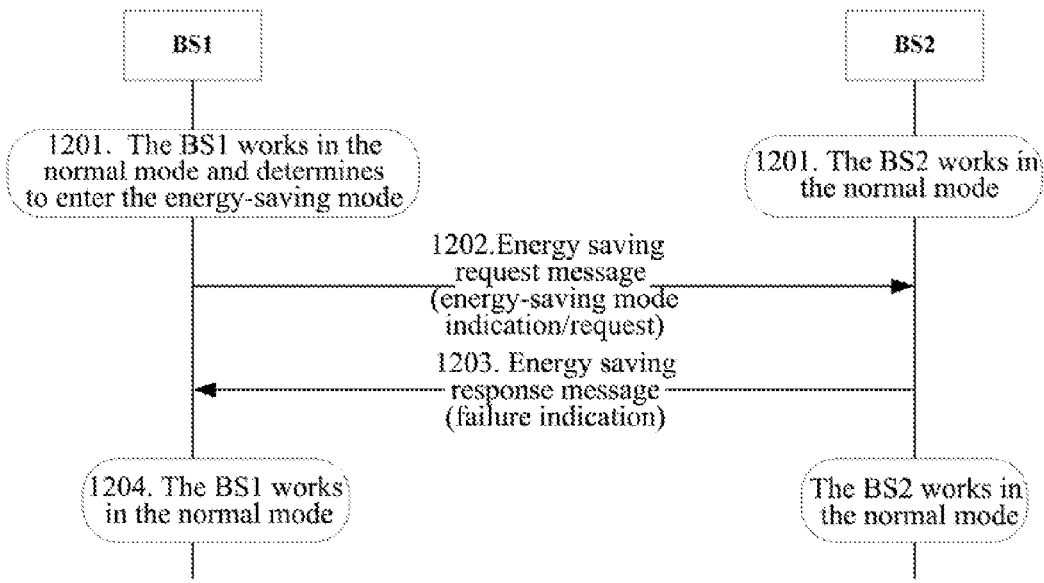
FIG. 12 shows a flow chart of failure in activating an energy-saving mode through an interface between base stations according to an embodiment of the invention.

FIG. 12 shows a flow chart of failure in activating an energy-saving mode through an interface between base stations. As shown in FIG. 12, the procedure mainly includes the following steps:

in step 1201: the BS1 and the BS2 are in the normal mode, the BS1 determines to enter the energy-saving mode; here the BS1 and the BS2 can be the cdma2000 1x base stations or the cdma2000 EVDO base stations;

in step 1202: the BS1 transmits the energy saving request message to the BS2, wherein, the message can optionally include energy-saving mode activation indication/request, the BS1 information, the BS2 information, the energy saving configuration identification information, the energy saving configuration information, etc.;

in step 1203: the BS2 transmits the energy saving response message to the BS1, wherein, the message can optionally include the failure indication, the failure reason, the BS1 information, the BS2 information, etc.; and the BS2 still works in the normal mode;

in step 1204: the BS1 receives the energy saving response message, and judges that the energy-saving mode activation indication/request is refused, and then the BS1 still works in the normal mode.

Example Eleven

Figure 13:
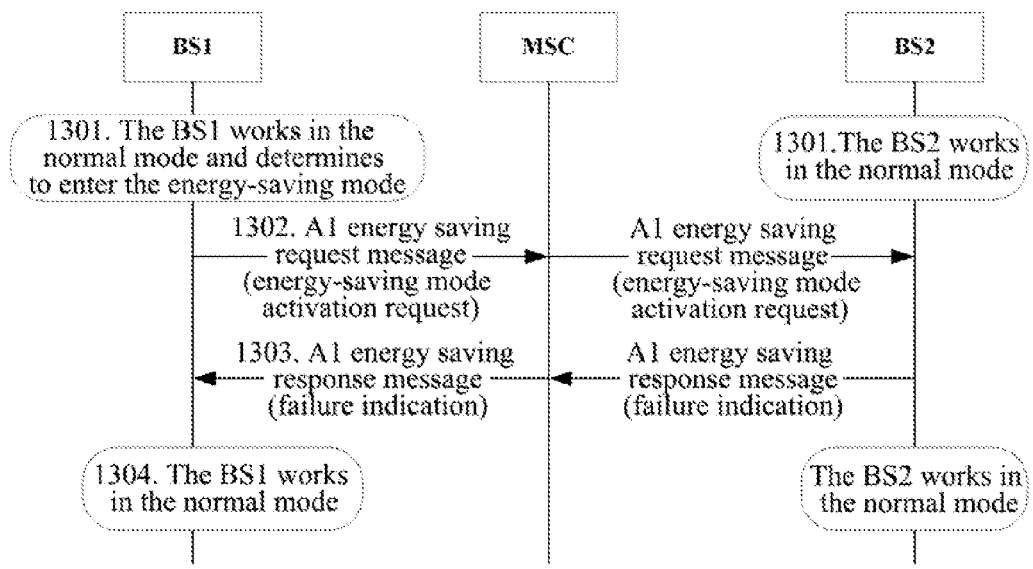
FIG. 13 shows a flow chart of failure in activating an energy-saving mode through an interface A1 according to an embodiment of the invention.

FIG. 13 shows a flow chart of failure in activating an energy-saving mode through an interface A1. As shown in FIG. 13, the procedure mainly includes the following steps:

in step 1301: the BS1 and the BS2 are in the normal mode, and the BS1 determines to enter the energy-saving mode; here the BS1 and the BS2 are the cdma2000 1x base stations;

in step 1302: the BS1 transmits the energy saving request message to the BS2 through the MSC, specifically including that: the BS1 transmits the energy saving request message to the MSC, the MSC transmits the energy saving request message to the BS2, wherein, the energy saving request message can optionally include the energy-saving mode activation request/indication, the BS1 information, the BS2 information, the energy saving configuration identification information, the energy saving configuration information, etc.;

in step 1303: the BS2 transmits the energy saving response message to the BS1 through the MSC, specifically including that: the BS2 transmits the energy saving response message to the MSC, and the MSC transmits the energy saving response message to the BS1; wherein, the message can optionally include the failure indication, the failure reason, the BS1 information, the BS2 information, etc.; and the BS2 still works in the normal mode;

in step 1304: the BS1 receives the energy saving response message, and judges that the energy-saving mode activation request/indication is refused, and then the BS1 still works in the normal mode.

Example Twelve

Figure 14:
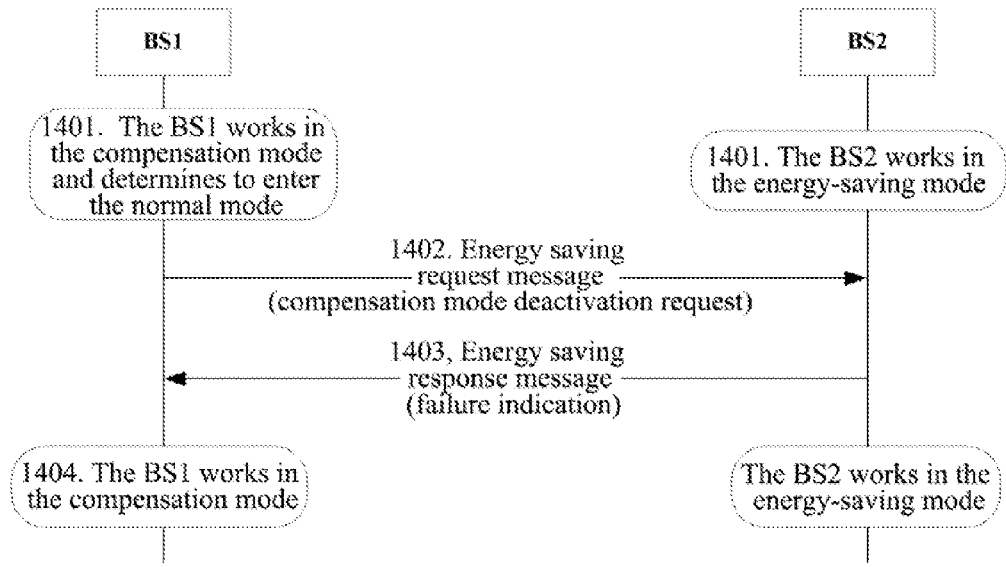
FIG. 14 shows a flow chart of failure in deactivating a compensation mode through an interface between base stations according to an embodiment of the invention.

FIG. 14 shows a flow chart of failure in deactivating a compensation mode through an interface between base stations. As shown in FIG. 14, the procedure mainly includes the following steps:

in step 1401: the BS1 is in the compensation mode, the BS1 determines to enter the normal mode, and the BS2 is in the energy-saving mode; here the BS1 and the BS2 can be the cdma2000 1x base stations or the cdma2000 EVDO base stations;

in step 1402: the BS1 transmits the energy saving request message to the BS2, wherein, the message can optionally include the compensation mode deactivation request/indication, the BS1 information, the BS2 information, the energy saving configuration identification information, the energy saving configuration information, etc.;

in step 1403: the BS2 transmits the energy saving response message to the BS1, wherein, the message can optionally include the failure indication, the failure reason, the BS1 information, the BS2 information, etc.; and the BS2 still works in the normal mode;

in step 1404: the BS1 receives the energy saving response message, and judges that the compensation mode deactivation request/indication is refused, and then the BS1 still works in the compensation mode.

Example Thirteen

Figure 15:
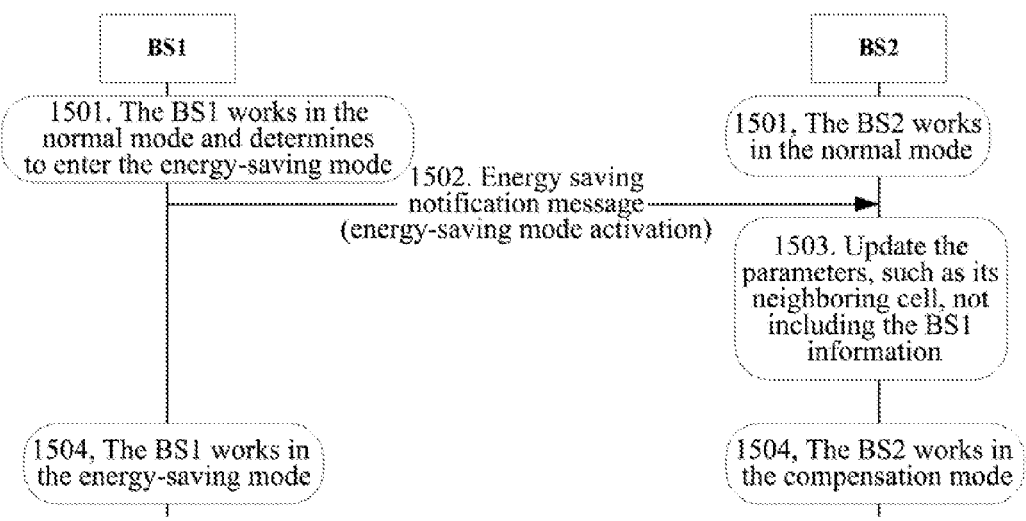
FIG. 15 shows a flow chart of performing an energy saving notification through an interface between base stations according to an embodiment of the invention.

FIG. 15 shows a flow chart of performing an energy saving notice through an interface between base stations. As shown in FIG. 15, the procedure mainly includes the following steps:

in step 1501: the BS1 and the BS2 are in the normal mode, the BS1 determines to enter the energy-saving mode; here the BS1 and the BS2 can be the cdma2000 1x base stations or the cdma2000 EVDO base stations;

in step 1502: the BS1 transmits the energy saving notification message to the BS2, wherein, the message can optionally include the energy-saving mode activation indication, the BS1 information, the BS2 information, the energy saving configuration information, etc.;

in step 1503: the BS2 knows that the BS1 enters the energy-saving mode after receiving the energy saving notification message, and the BS2 updates the parameters, such as, its neighboring cell, etc., not including the BS1 information;

in step 1504: the BS1 works in the energy-saving mode and the BS2 works in the compensation mode.

In the present embodiment, the BS1 can enter the energy-saving mode directly after transmitting the energy saving notification message, or enters the energy-saving mode after waiting for a predetermined period of time; the BS2 can enter the compensation mode directly after receiving the energy saving notice, or enters the compensation mode after waiting for a predetermined period of time; the base stations can determine the implementation way according to the actual conditions.

The base stations can implement the energy saving notifying function through the interface with the MSC.

Correspondingly, the examples of the invention further provide a system for transmitting energy-saving management information, mainly including a message capsulation module and a message transmission module in a base station, wherein, the message capsulation module is configured to capsulate the energy-saving management information through an interface message; and the message transmission module is configured to transmit the energy-saving management information through transmitting the interface message.

Further, the energy-saving management information encapsulated by the message capsulation module includes energy saving status information, wherein, the energy saving status information includes one or more of the following information:

an energy-saving mode activation indication, an energy-saving mode deactivation indication, a compensation mode activation indication, a compensation mode deactivation indication, a non-service status indication, an non-service status exiting indication, an energy saving request acceptance indication, an energy saving request failure indication, and failure reason information.

Further, the energy-saving management information encapsulated by the message capsulation module includes the energy-saving management information of the following base stations:

a base station detected in a non-service status, a base station entering an energy-saving mode, a base station exiting the energy-saving mode, a base station entering a compensation mode, a base station exiting the compensation mode, and a base station exiting the non-service status.

Further, the energy-saving management information encapsulated by the message capsulation module includes base station information, wherein, the base station information comprises one of the following information or any combination thereof:

cell information, sector information, and/or carrier information.

Further, the energy-saving management information encapsulated by the message capsulation module further includes energy saving configuration information, wherein, the energy saving configuration information comprises one of the following or a combination thereof: an energy saving related parameter identifier, an energy saving operation timer and an energy saving operation threshold which are pre-configured between the base stations.

In addition, the embodiments of the invention further provide a system for implementing base station energy saving, comprising an energy-saving information transmission module and an energy-saving information receiving module in a base station, wherein, the energy-saving information transmission module is configured to: when a local base station is detected to be unable to provide a service or determines to enter an energy-saving mode, transmit energy-saving management information to a neighboring base station; and the energy-saving information receiving module is configured to: determine whether to enter a compensation mode or not after receiving the energy-saving management information transmitted by the neighboring base station; wherein, the compensation mode includes one of the following or a combination thereof: performing a coverage compensation to the base station, and updating a parameter of a neighboring cell.

Further, the energy-saving information transmission module is further configured to: transmit the energy-saving management information to the neighboring base station through an energy saving request message, wherein, the energy-saving management information includes base station information and/or energy saving status information; and enter a non-service status or an energy-saving mode upon receiving an energy saving response returned by the neighboring base station and when the energy saving response message carries an energy-saving mode activation acceptance indication, a non-service status confirmation indication or a compensation mode activation acceptance indication; wherein, the base station information includes: cell information, sector information, and/or carrier information; and the energy saving status information includes one or more of the following information: an energy-saving mode activation indication, a non-service status indication or a compensation mode activation indication;

the energy-saving information receiving module is further configured to: if the energy-saving mode activation indication, the non-service status indication or the compensation mode activation indication is accepted, then return the energy saving response message carrying an energy-saving mode activation acceptance indication, a non-service status confirmation indication or a compensation mode activation acceptance indication, and enter a compensation mode at the same time; if not, then return the energy saving response message carrying an energy-saving mode activation failure or a compensation mode activation failure indication.

Further, the energy-saving information transmission module is configured to: transmit the energy-saving management information to the neighboring base station through the energy saving notification message, wherein the energy-saving management information includes the base station information and/or the energy saving status information; and enter a non-service status or an energy-saving mode after transmitting the energy saving notification message; and wherein, the base station information includes: cell information, sector information, and/or carrier information; and the energy saving status information includes one or more of the following information: an energy-saving mode activation indication, a non-service status indication or a compensation mode activation indication.

Further, the energy-saving information transmission module is further configured to: when determining to exit the non-service status or exit the energy-saving mode, transmit an energy saving notification message carrying an non-service status exiting indication or an energy-saving mode deactivation indication to the neighboring base station; and exit the non-service status or exit the energy-saving mode after transmitting the energy saving notification message; and the energy-saving information receiving module is further configured to: if the non-service status exiting indication or the energy-saving mode deactivation indication is accepted, then exit the compensation mode.

Further, the energy-saving information transmission module is further configured to: when determining to exit the non-service status or exit the energy-saving mode, transmit an energy saving request message carrying an non-service status exiting indication or an energy-saving mode deactivation indication to the neighboring base station; and exit the non-service or exit the energy-saving mode when receiving the energy saving response message returned by the neighboring base station and the energy saving response message carries the non-service status acceptance indication or the energy-saving mode deactivation acceptance indication; otherwise, continue to maintain the non-service status or the energy-saving mode; and the energy-saving information receiving module is further configured to: if the non-service status exiting indication or the energy-saving mode deactivation indication is accepted, then exit the compensation mode, and at the same time return the energy saving response message carrying a non-service status exiting acceptance indication or an energy-saving mode deactivation acceptance indication; if the non-service status exiting indication or the energy-saving mode deactivation indication is not accepted, then return the energy saving response message carrying a non-service status exiting failure indication or an energy-saving mode deactivation failure indication and/or a failure reason value.

Further, the energy-saving information transmission module is further configured to: when determining to exit the compensation mode, transmit an energy saving notification message carrying the compensation mode deactivation indication to the base station, and exit the compensation mode after transmitting the energy saving notification message; and the energy-saving information receiving module is further configured to: if the compensation mode deactivation indication is accepted, then exit the non-service status or exit the energy-saving mode.

Further, the energy-saving information transmission module is further configured to: when determining to exit the compensation mode, transmit an energy saving request message carrying the compensation mode deactivation indication to the base station; and exit the compensation mode upon receiving the energy saving response message returned by the base station and when the energy saving response message carries a compensation mode deactivation acceptance indication; and the energy-saving information receiving module is further configured to: if the compensation mode deactivation indication is accepted, then exit the non-service status or exit the energy-saving mode, and return the energy saving response message carrying the compensation mode deactivation acceptance indication at the same time; if the compensation mode deactivation indication is not accepted, then return the energy saving response message carrying a compensation mode deactivation failure indication.

The energy-saving information transmission module is further configured to: transmit the energy saving notification message, the energy saving request message or the energy saving response message through an interface between the base stations or an interface between the base station and a mobile switching center; and the energy-saving management information in the transmitted energy saving notification message, energy saving request message or energy saving response message further comprises an energy saving configuration information, wherein, the energy saving configuration information comprises one of the following or a combination thereof: an energy saving related parameter identifier, an energy saving operation timer and an energy saving operation threshold which are pre-configured between the base stations.

The above description is only the preferred embodiments of the invention and is not intended to limit the invention. The invention may have a variety of other embodiments. Those skilled in the art can make corresponding modifications and variations according to the invention without departing from the spirit and essence of the invention. And all of these modifications or the variations should fall within the scope of the attached claims of the invention.

Obviously, it can be understood by those skilled in the art that each module or each step above-mentioned in the invention can be implemented by the universal calculating apparatus, and they can be integrated in a single calculating apparatus, or distributed in the network made up by a plurality of calculating apparatus. Alternatively, they can be implemented by the executable program codes of the calculating apparatus. Accordingly, they can be stored in the storage apparatus and implemented by the calculating apparatus, and in some situation, the shown or described steps can be executed according to a sequence different from that in here, or they are made to integrated circuit modules respectively, or a plurality of modules or steps thereof are made into the single integrated circuit module to be implemented. In this way, the invention is not limit to any specific form of the combination of the hardware and software.

INDUSTRIAL APPLICABILITY

The embodiments of the invention provide a method for transmitting the energy saving related information between the base stations and implementing the energy saving based on the energy saving related information, which can be used to solve transmission of the energy-saving information between base station devices of a network, and avoid the problems such as handoff and coverage loss caused by the base station being required to be shut off due to reasons such as energy saving, etc., thus guaranteeing network performance and user experience when the base station is performing the energy saving operation; in addition, when the base station is in the non-service status, it can notify its neighboring base stations to allow these neighboring base stations to adjust the corresponding parameters, thus avoiding the problems such as handoff, coverage loss, and increase of power consumption at the terminal caused by abnormality of the base station.

What we claim is:

1. A method for implementing base station energy saving, comprising:
when a base station is detected to be unable to provide a service or a base station determines to enter an energy-saving mode, transmitting energy-saving management information to a neighboring base station to get compensation from the neighboring base station,
wherein, the compensation mode comprises one of the following or a combination thereof: performing a coverage compensation to the base station, and updating a parameter of a neighboring cell;
the base station transmits the energy-saving management information to the neighboring base station through an energy saving request message, wherein, the energy-saving management information comprises base station information and/or energy saving status information, wherein, the base station information comprises: cell information, sector information, and/or carrier information; the energy saving status information comprises one or more of the following information: an energy-saving mode activation indication, a non-service status indication or a compensation mode activation indication;
if the neighboring base station accepts the energy-saving mode activation indication, the non-service status indication or the compensation mode activation indication, the base station receives an energy saving response message from the neighboring base station and enters a non-service status or an energy-saving mode, wherein the energy saving response message includes an energy-saving mode activation acceptance indication, a non-service status confirmation indication or a compensation mode activation acceptance indication; if the neighboring base station refuses the energy-saving mode activation indication, the non-service status indication or the compensation mode activation indication, the base station receives an energy saving response message from the neighboring base station, wherein the energy saving response message includes an energy-saving mode activation failure or a compensation mode activation failure indication.

2. The method according to claim 1, further comprising:
when the base station determines to exit the non-service status or exit the energy-saving mode, transmitting the energy saving notification message carrying a non-service status exiting indication or an energy-saving mode deactivation indication to the neighboring base station;
if the neighboring base station accepts the non-service status exiting indication or the energy-saving mode deactivation indication, the base station exiting the non-service status or exiting the energy-saving mode after transmitting the energy saving notification message.

3. The method according to claim 1, further comprising:
when the base station determines to exit the non-service status or exit the energy-saving mode, transmitting an energy saving request message carrying a non-service status exiting indication or an energy-saving mode deactivation indication to the neighboring base station;
if the neighboring base station accepts the non-service status exiting indication or the energy-saving mode deactivation indication, the base station receiving an energy saving response message from the neighboring base station and exiting the non-service status or the energy-saving mode, wherein the energy saving response message includes a non-service status exiting acceptance indication or an energy-saving mode deactivation acceptance indication; if the neighboring base station refuses the non-service status exiting indication or the energy-saving mode deactivation indication, the base station receiving an energy saving response message from the neighboring base station and maintaining the non-service status or the energy-saving mode, wherein the energy saving response message includes a non-service status exiting failure indication or an energy-saving mode deactivation failure indication and/or a failure reason value.

4. The method according to claim 1, further comprising:
when the neighboring base station determines to exit the compensation mode, the base station receiving an energy saving notification message with a compensation mode deactivation indication from the neighboring base station; and
if the base station accepts the compensation mode deactivation indication, the base station exiting the non-service status or exiting the energy-saving mode.

5. The method according to claim 1, further comprising:
when the neighboring base station determines to exit the compensation mode, the base station receiving an energy saving request message with a compensation mode deactivation indication from the neighboring base station;
if the base station accepts the compensation mode deactivation indication, the base station exiting the non-service status or the energy-saving mode and transmitting an energy saving response message to the neighboring base station, wherein the energy saving response message includes a compensation mode deactivation acceptance indication which makes the neighboring base station exit the compensation mode; if the base station refuses the compensation mode deactivation indication, the base station transmitting an energy saving response message with a compensation mode deactivation failure indication and/or a failure reason value.

6. The method according to claim 1, further comprising:
the energy saving notification message, the energy saving request message or the energy saving response message being transmitted through an interface between the base stations or an interface between the base station and a mobile switching center; and
the energy-saving management information further comprising energy saving configuration information, wherein, the energy saving configuration information comprises one of the following or a combination thereof: an energy saving related parameter identifier, an energy saving operation timer and an energy saving operation threshold which are pre-configured between the base stations.

7. A base station for implementing base station energy saving, comprising an energy-saving information transmission module and an energy-saving information receiving module in a base station, wherein,
the energy-saving information transmission module is configured to: when a local base station is detected to be unable to provide a service or a local base station determines to enter an energy-saving mode, transmit energy-saving management information to a neighboring base station; and
the energy-saving information receiving module is configured to: determine whether to enter a compensation mode or not after receiving the energy-saving management information transmitted by the neighboring base station; wherein, the compensation mode comprises one of the following or a combination thereof: performing a coverage compensation to the base station, and updating a parameter of a neighboring cell;
wherein the energy-saving information transmission module is further configured to: transmit the energy-saving management information to the neighboring base station through an energy saving request message, wherein, the energy-saving management information comprises base station information and/or energy saving status information; and enter a non-service status or an energy-saving mode when receiving an energy saving response message returned by the neighboring base station and when the energy saving response message carries an energy-saving mode activation acceptance indication, a non-service status confirmation indication or a compensation mode activation acceptance indication; wherein, the base station information comprises: cell information, sector information, and/or carrier information; and the energy saving status information comprises one or more of the following information: an energy-saving mode activation indication, a non-service status indication or a compensation mode activation indication;
the energy-saving information receiving module is further configured to: if the energy-saving mode activation indication, the non-service status indication or the compensation mode activation indication is accepted, then return an energy saving response message carrying the energy-saving mode activation acceptance indication, the non-service status confirmation indication or the compensation mode activation acceptance indication, and enter a compensation mode; if not, then return an energy saving response message carrying an energy-saving mode activation failure or a compensation mode activation failure indication.

8. The base station according to claim 7, wherein,
the energy-saving information transmission module is further configured to: when determining to exit the non-service status or exit the energy-saving mode, transmit to the neighboring base station the energy saving notification message carrying a non-service status exiting indication or an energy-saving mode deactivation indication; and exit the non-service status or exit the energy-saving mode after transmitting the energy saving notification message; and
the energy-saving information receiving module is further configured to: if the non-service status exiting indication or the energy-saving mode deactivation indication is accepted, then exit the compensation mode.

9. The base station according to claim 7, wherein,
the energy-saving information transmission module is further configured to: when determining to exit the compensation mode, transmit an energy saving request message carrying a compensation mode deactivation indication to the base station; and exit the compensation mode when receiving the energy saving response message returned by the base station and when the energy saving response message carries a compensation mode deactivation acceptance indication; and
the energy-saving information receiving module is further configured to: if the compensation mode deactivation indication is accepted, then exit the non-service status or exit the energy-saving mode, and return an energy saving response message carrying the compensation mode deactivation acceptance indication; if the compensation mode deactivation indication is not accepted, then return an energy saving response message carrying a compensation mode deactivation failure indication.

10. The base station according to claim 7, wherein,
the energy-saving information transmission module is further configured to: when determining to exit the non-service status or exit the energy-saving mode, transmit an energy saving request message carrying a non-service status exiting indication or an energy-saving mode deactivation indication to the neighboring base station; and exit the non-service status or exit the energy-saving mode when receiving the energy saving response message returned by the neighboring base station and the energy saving response message carries the non-service status acceptance indication or the energy-saving mode deactivation acceptance indication; otherwise, continue to maintain the non-service status or the energy-saving mode; and
the energy-saving information receiving module is further configured to: if the non-service status exiting indication or the energy-saving mode deactivation indication is accepted, then exit the compensation mode, and return an energy saving response message carrying a non-service status exiting acceptance indication or an energy-saving mode deactivation acceptance indication; if the non-service status exiting indication or the energy-saving mode deactivation indication is not accepted, then return an energy saving response message carrying a non-service status exiting failure indication or an energy-saving mode deactivation failure indication and/or a failure reason value.

11. The base station according to claim 7, wherein,
the energy-saving information transmission module is further configured to: when determining to exit the compensation mode, transmit an energy saving notification message carrying a compensation mode deactivation indication to the base station, and exit the compensation mode after transmitting the energy saving notification message; and
the energy-saving information receiving module is further configured to: if the compensation mode deactivation indication is accepted, then exit the non-service status or exit the energy-saving mode.

12. The base station according to claim 7, wherein, the energy-saving information transmission module is further configured to: transmit an energy saving notification message, an energy saving request message or an energy saving response message through an interface between the base stations or an interface between the base station and a mobile switching center; and the energy-saving management information in the transmitted energy saving notification message, energy saving request message or energy saving response message further comprises an energy saving configuration information, wherein, the energy saving configuration information comprises one of the following or a combination thereof: an energy saving related parameter identifier, an energy saving operation timer and an energy saving operation threshold which are pre-configured between the base stations.

\* \* \* \* \*